United States Patent [19]

Dwivedi

[11] Patent Number: 5,082,700
[45] Date of Patent: Jan. 21, 1992

[54] METHOD OF MAKING CERAMIC COMPOSITE ARTICLES AND ARTICLES MADE THEREBY

[75] Inventor: Ratnesh K. Dwivedi, Wilmington, Del.

[73] Assignee: Lanxide Technology Company, LP, Newark, Del.

[21] Appl. No.: 429,210

[22] Filed: Oct. 30, 1989

Related U.S. Application Data

[63] Continuation of Ser. No. 84,550, Aug. 10, 1987, Pat. No. 4,886,766.

[51] Int. Cl.[5] ............... F16L 9/10; F16L 9/19
[52] U.S. Cl. .................. 428/34.4; 428/34.5; 428/188; 428/693; 138/114
[58] Field of Search ........... 428/34.4, 34.5, 693, 428/188; 138/114

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church | 264/60 |
| 3,864,154 | 2/1975 | Gazza et al. | 29/123 B |
| 3,915,699 | 10/1975 | Umehara et al. | 75/208 R |
| 3,973,977 | 8/1976 | Wilson | 106/62 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 0193292 | 9/1986 | European Pat. Off. . |
| 1171511 | 3/1967 | United Kingdom . |

OTHER PUBLICATIONS

"Oxidation of Molten Aluminum Alloys, Reaction with Refractories"-M. Drouzy and M. Richard-Mar. 1974, Fonderie, France No. 332, pp. 121-128.
"Refractories for Aluminum Alloy Melting Furnaces'-'-B. Clavaud and V. Jost-Sep. 1980-Lillian Brassinga (from French), Jan. 1985.

Primary Examiner—James J. Seidleck
Attorney, Agent, or Firm—Mark G. Mortenson; Jeffrey R. Ramberg

[57] ABSTRACT

A method is provided for producing a self-supporting ceramic composite body having a plurality of spaced apart wall members, each wall member having a bounded cross-section for defining substantially continuous, fluid passageways. The wall members generally inversely replicate in opposed directions the geometry of a positive pattern. Each of the wall members, which are axially aligned, comprises a ceramic matrix having a filler embedded therein, and is obtained by the oxidation reaction of a parent metal to form a polycrystalline material which comprises the oxidation reaction product of the parent metal with an oxidant and, optionally, one or more metals, e.g. nonoxidized constituents of the parent metal.

16 Claims, 6 Drawing Sheets ns and/or porosity, which may or may not be interconnected. The process may be enhanced by the use of an alloyed dopant, such as in the case of an aluminum parent metal oxidized in air. This method was improved upon by the use of external dopants applied to the surface of the precursor metal as disclosed in Commonly Owned U.S. Pat. No. 4,853,352, which issued on Aug. 1, 1989, in the names of Marc S. Newkirk et al. and entitled "Method of Making Self-Supporting Ceramic Materials and Materials Made Thereby" and was based on U.S. patent application Ser. No. 220,935, which was a Rule 62 Continuation of U.S. patent application Ser. No. 822,999, filed Jan. 27, 1986, in the names of Marc S. Newkirk, et al. and entitled "Methods of Making Self-Supporting Ceramic Materials".

METHOD OF MAKING CERAMIC COMPOSITE ARTICLES AND ARTICLES MADE THEREBY

CROSS-REFERENCE TO RELATED APPLICATION

This application is a continuation of U.S. patent application Ser. No. 07/084,550, which was filed on Aug. 10, 1987, and which issued as U.S. Pat. No. 4,886,766 on Dec. 12, 1989.

FIELD OF THE INVENTION

The present invention broadly relates to a self-supporting ceramic composite body having a plurality of spaced apart wall members each with a bounded cross-section and defining fluid passageways, and to methods of making the same. More particularly, the invention relates to a self-supporting ceramic composite body comprising a polycrystalline ceramic matrix embedding a filler material and having a plurality of axially aligned, spaced apart wall members each having a bounded cross-section, which generally inversely replicate in opposed directions the geometry of a cavited pattern of parent metal; and to methods of making the composite body by infiltrating beddings of filler material with the oxidation reaction product of a parent metal preshaped as a positive pattern and inversely replicated in opposed directions to form spaced apart wall members defining fluid passageways.

DESCRIPTION OF COMMONLY OWNED PATENT APPLICATIONS AND BACKGROUND

The subject matter of this application is related to that of and Commonly Owned U.S. Pat. No. 4,851,375, which issued on July 25, 1989, in the names of Marc S. Newkirk et al. and entitled "Methods of Making Composite Ceramic Articles Having Embedded Filler", and was based on U.S. patent application Ser. No. 819,397, filed Jan. 17, 1986, in the names of Marc S. Newkirk, et al. and entitled "Composite Ceramic Articles and Methods of Making Same". This patent discloses a novel method for producing a self-supporting ceramic composite by growing an oxidation reaction product from a parent metal into a permeable mass of filler. The resulting composite, however, has no defined or predetermined configuration.

The method of growing a ceramic product by an oxidation reaction is disclosed generically in U.S. Pat. No. 4,713,360 which issued on Dec. 15, 1987 and was based on Commonly Owned U.S. patent application Ser. No. 818,943, filed Jan. 15, 1986, in the names of Marc S. Newkirk, et al. and entitled "Novel Ceramic Materials and Methods of Making the Same". This patent discloses the method of producing self-supporting ceramic bodies grown as the oxidation reaction product from a parent metal as the precursor. Molten parent metal is reacted with a vapor-phase oxidant to form an oxidation reaction product, and the metal migrates through the oxidation reaction product toward the oxidant thereby continuously developing a polycrystalline ceramic body of the oxidation reaction product. Typically in the polycrystalline ceramic bodies, the oxidation reaction product crystallites are interconnected in more than one dimension, preferably in three dimensions. When the process is not conducted beyond the exhaustion of the parent metal, the ceramic body obtained is dense and essentially void free. Where desired, the ceramic body can be produced having metal Further developments of the foregoing methods enable the formation of ceramic composite structures comprising a polycrystalline ceramic matrix embedding a filler and having one or more cavities formed by inversely replicating the geometry of a shaped, precursor parent metal. These methods are described in (1) Commonly Owned U.S. Pat. No. 4,828,785, which issued on May 9, 1989, and was based on U.S. patent application Ser. No. 823,542, filed Jan. 27, 1986, in the names of Marc S. Newkirk, et al. and, entitled "Inverse Shape Replication Method of Making Ceramic Composite Articles and Articles Obtained Thereby", and (2) Commonly Owned U.S. Pat. No. 4,859,640, which issued on Aug. 22, 1989, and was based on U.S. patent application Ser. No. 896,157, filed Aug. 13, 1986 in the name of Marc S. Newkirk and entitled "Method of Making Ceramic Composite Articles with Shape Replicated Surfaces and Articles Obtained Thereby".

Also, a method was developed for making ceramic composite structures having a pre-selected shape or geometry by utilizing a shaped preform of permeable filler into which the ceramic matrix is grown upon the bulk oxidation of a parent metal, as described in Commonly Owned U.S. patent application Ser. No. 338,471, filed Apr. 14, 1989, now allowed, which is a Rule 62 Continuation of U.S. patent application Ser. No. 861,025, filed May 8, 1986, in the names of Marc S. Newkirk et al. and entitled "Shaped Ceramic Composites and Methods of Making the Same". Shaped ceramic composites exhibiting high fidelity have been achieved by utilizing a barrier means to arrest or inhibit the growth of the oxidation reaction product at a selected boundary to define the shape or geometry of the ceramic composite structure. This technique is described in Commonly Owned U.S. Pat. No. 4,923,832, which issued on May 8, 1990, which was based on U.S. patent application Ser. No. 861,024, filed May 8, 1986, in the names of Newkirk et al. and entitled "Method of Making Shaped Ceramic Composites with the Use of a Barrier".

The entire disclosures of all of the foregoing Commonly Owned U.S. patent applications and patents are expressly incorporated herein by reference.

One factor in using the methods of the above-mentioned Commonly Owned U.S. patent applications and patents to produce a ceramic composite body is that the filler materials employed are permeable to the oxidant when required for the oxidant to contact the molten parent metal and further are permeable to infiltration by the developing oxidation reaction product into the filler. The ceramic composite structures produced are generally an integral, unitary ceramic composite body which may have the original configuration of a preform of filler, or may include a cavity whose boundaries and geometry are determined by the shape of a preshaped parent metal.

The present invention is a still further improvement in providing a self-supporting ceramic body having spaced wall members each with a bounded cross-section defining fluid passageways, which ceramic body is produced by inverse replication of a shaped parent metal.

SUMMARY OF THE INVENTION

In accordance with the present invention, there is provided a method for producing a self-supporting ceramic composite body having a plurality of spaced apart wall members, each wall member having a bounded cross-section for defining substantially continuous, fluid passageways. The wall members generally inversely replicate in opposed directions the geometry of a positive pattern. Each of the wall members, which are axially aligned, comprises a ceramic matrix having a filler embedded therein, and is obtained by the oxidation reaction of a parent metal to form a polycrystalline material which comprises the oxidation reaction product of the parent metal with an oxidant and, optionally, one or more metals, e.g. non-oxidized constituents of the parent metal. The method comprises the steps Described below: The parent metal is shaped to provide a cylindrical pattern (as defined below) having at least one open cavity or bore thereby forming opposed wall surfaces, i.e. the cavity interior wall of the cavity and the exterior wall. The wall thickness, which is predetermined upon shaping of the metal pattern, determines the space between wall members in the final product. A filler material is juxtaposed on both wall surfaces of the cylindrical pattern. The beddings of filler material may be over the entire surface of each wall, or over a predetermined portion or area only, and the area covered will determined the area of the wall members of the final composite product. The filler material (1) is permeable to the oxidant when required, as in the case where the oxidant is a vapor-phase oxidant and, in any case, is permeable to infiltration by the developing oxidation reaction product; and (2) has sufficient conformability over the heat-up temperature interval to accommodate the differential thermal expansion between the bed of filler and the parent metal plus the melting-point volume change of the metal. Each bedding of filler material, at least in support zones disposed inwardly of the cavity wall and outwardly of the exterior wall so as to envelope the pattern, is intrinsically self-bonding above a temperature which is above the melting point of the parent metal but below and preferably very close to the oxidation reaction temperature, whereby the beddings of filler material have sufficient cohesive strength to retain the inversely replicated geometry of the pattern within the beddings upon migration of the parent metal, as described below.

The shaped parent metal with juxtaposed beddings is heated to a temperature region above its melting point but below the melting point of the oxidation reaction product to form a body of molten parent metal, and the molten parent metal is reacted in that temperature region or interval with the oxidant to form the oxidation reaction product. At least a portion of the oxidation reaction product is maintained in that temperature region and in contact with and between the body of molten metal and the oxidant, whereby molten metal is progressively drawn from the body of molten metal through the oxidation reaction product to continue forming the oxidation reaction product at the interface between the oxidant and previously formed oxidation reaction product. This reaction is continued in that temperature region for a time sufficient to at least partially infiltrate both beddings with the oxidation reaction product by growth of the latter, concurrently forming spaced apart wall members each having a bounded cross-section, and leaving a defined passageway or channel therebetween formerly occupied by metal and a central passageway or channel bounded by the innermost wall member. That is, oxidation reaction product grows in opposed directions into the beddings, and migration and conversion of the metal results in the formation of a ceramic matrix inversely replicating in opposed directions the adjacent portion of the metal pattern thereby forming fluid passageways. The fluid passageway between wall members is the image of the wall of the parent metal. The resulting self-supporting composite body is separated from excess filler, if any, and the product recovered comprises a multi-walled, cylindrical ceramic composite body with a longitudinal fluid passageway between wall members and central fluid passageway. The wall members are axially aligned, and preferably coaxially aligned such that the walls are substantially concentric.

In another aspect of the invention, there is provided means for supporting the wall members from collapsing and for maintaining the walls in spaced relation. In one embodiment, the support means is formed integrally with the ceramic composite body by providing one or more apertures or bores in the pattern and filling the apertures with filler material. During processing, oxidation reaction product grows as a matrix into this filler as well as into the beddings of filler adjacent the walls, thereby forming ceramic connecting ribs between wall members. In another embodiment utilizing a parent metal pattern of two or more cylinders, a support means may be incorporated between cylinders, and upon formation into the ceramic composite body the support means is bonded in place by the oxidation reaction product thereby connecting and supporting spaced apart ceramic cylinders.

DEFINITIONS

As used in this specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents derived from the parent metal, or reduced from the oxidant or dopant, most typically within a range of from about 1–40% by volume, but may include still more metal.

"Oxidation reaction product" generally means one or more metals in any oxidized state wherein the metal has given up electrons to or shared electrons with another element, compound, or combination thereof. Accordingly, an "oxidation reaction product" under this definition includes the product of the reaction of one or more metals with an oxidant as described herein.

"Oxidant" means one or more suitable electron acceptors or electron sharers and may be an element, a combination of elements, a compound, or a combination of compounds, including reducible compounds, and is a solid, a liquid, or a gas (vapor) or some combination of these (e.g. a solid and a gas) at the process conditions.

"Parent metal" refers to that metal, e.g. aluminum, which is the precursor for the polycrystalline oxidation reaction product, and includes that metal as a relatively pure metal, a commercially available metal with impurities and/or alloying constituents, or an alloy in which that precursor metal is the major constituent; and when a specified metal is mentioned as the parent metal, e.g. aluminum, the metal should be read with this definition in mind unless indicated otherwise by context.

"Cylindrical wall" or "cylindrical wall member" is not to be unduly construed as being limited to a wall whose shape in transverse cross-section defines a circle, but rather refers to any wall whose transverse cross-section may be of any suitable bounded shape, such as circular, elliptical, triangular, rectangular or any other polygonal (e.g. pentagonal, octagonal, etc.) cross-section. Further, the term includes walls whose surfaces are not only planar and smooth, but also walls having any type or shape of undulations, such as serrated, sinusoidal, corrugated, or the like.

DETAILED DESCRIPTION OF THE INVENTION AND PREFERRED EMBODIMENTS THEREOF

Figure 1:
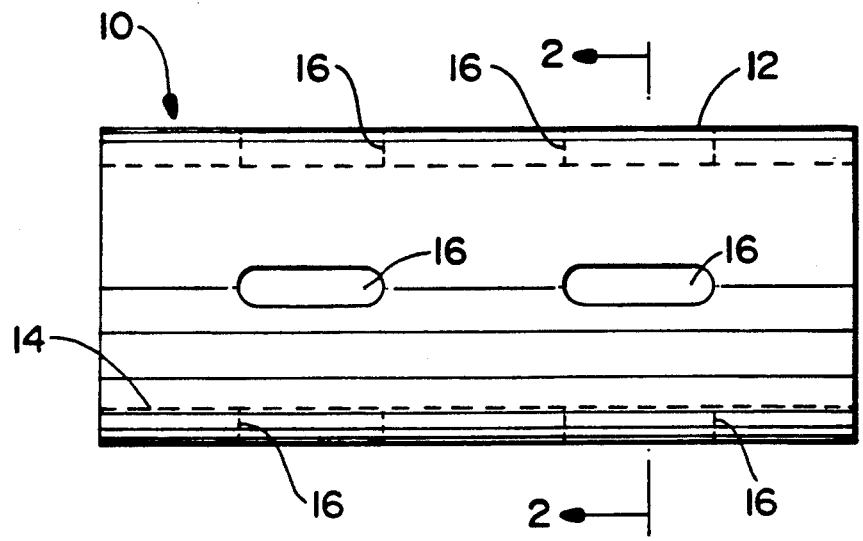
FIG. 1 is a horizontal view of a pattern of a parent metal shaped as a cylindrical conduit having a plurality of bores extending transversely through the wall of the cylinder.

In the practice of the present invention, the parent metal is provided in the form of a mold or pattern having at least one axially extending bore, cavity, channel, or the like, which is open at least at one end. By following the method of the present invention, the pattern of the parent metal is inversely replicated in opposed directions to produce a self-supporting ceramic composite body comprising a plurality of spaced walls each having a bounded cross-section. The invention obviates the steps of producing separately cylindrical bodies which are then concentrically arranged and interconnected. The term "inversely replicated" means that the space formed between walls in the product is defined by the opposed surfaces of adjacent ceramic walls, which are substantially congruent to the original shape of the parent metal. That is, if the parent metal as the pattern comprises a cylindrical conduit with a circular cross-section, the space formed between the wall members of the ceramic product will be of substantially the same width as the thickness of the cylinder wall and will be circular in cross-section as the negative replicate of the geometry of the pattern.

The pattern of parent metal may be shaped by any appropriate means as long as it contains at least one open bore or cavity, preferably extending through the shaped parent metal, along the longitudinal axis e.g. a cylindrical conduit. For example, a piece of metal such as a pipe, tube, or any other conduit having a longitudinal bore extending entirely therethrough, thereby forming a cylinder, may be suitably machined, cast, molded, extruded or otherwise shaped to provide the shaped pattern. The parent metal as the pattern may have grooves, bores, apertures, recesses, bosses, flanges, or the like to provide a pattern for forming a support means for the ceramic composite, as explained below in greater detail. The parent metal pattern may have any suitable bounded cross-section ranging from circular to polygonal, as defined above. Regardless of the shape of the parent metal, a filler material is juxtaposed on the wall surfaces of the pattern, which includes the cavity or inside wall and the exterior wall, and preferably the wall surfaces are parallel thereby providing a fluid passageway of substantially uniform cross-section. It is expedient to fill the cavity with a conformable filler material, which is then embedded in another conformable bed of filler material contained in a suitable crucible or vessel. The two filler materials may be the same or different in composition, grade, purity or structure. The pattern thus defines a shaped cavity within the conformable beddings of filler material and occupies the shaped cavity within this mass of filler. When the parent metal occupying the space is ultimately melted and oxidizes and migrates out of the filled space, a plurality of ceramic walls bounded in cross-section and axially aligned, develops in opposed directions thereby forming a space having boundaries within the resulting ceramic composite body that are substantially congruent to the shape of the original parent metal pattern. Thus, the wall thickness of the pattern of parent metal can determine the cross-sectional width of the space between wall members. The resulting ceramic composite product possesses substantially the geometric configuration of the original pattern, adjusted for melting point and thermal expansion differential volume changes of the parent metal during processing with respect to the composite body formed and cooled. Thus, in one aspect, the present invention provides the advantage of making a ceramic body of intricate geometry by machining a metal pattern, rather than machining a ceramic to shape, which is more difficult and costly.

Although the invention is described below in detail with specific reference to aluminum as the preferred parent metal, other suitable parent metals which meet the criteria of the present invention include, but are not limited to, silicon, titanium, tin, zirconium and hafnium.

In practicing the process of this invention, the setup of parent metal as the pattern and beddings of filler is heated in an oxidizing environment to a temperature above the melting point of the metal but below the melting point of the oxidation reaction product, resulting in a body or pool of molten metal. On contact with the oxidant, the molten metal will react to form a layer of oxidation reaction product. Upon continued exposure to the oxidizing environment, within an appropriate temperature region, the remaining molten metal is progressively drawn into and through the oxidation reaction product in the direction of the oxidant and into the beddings of filler and there, on contact with the oxidant, forms additional oxidation reaction product. At least a portion of the oxidation reaction product is maintained in contact with and between the molten parent metal and the oxidant so as to cause continued growth of the polycrystalline oxidation reaction product in the beddings of filler, thereby infiltrating and embedding the filler within the polycrystalline oxidation reaction product. The polycrystalline matrix material continues to grow so long as suitable oxidation reaction conditions are maintained and any portion of the unoxidized parent metal body remains.

The process is continued until the oxidation reaction product has infiltrated and embedded the desired amount of beddings of filler. The resulting ceramic composite product includes filler embedded by a ceramic matrix comprising a polycrystalline oxidation reaction product and, optionally, one or more nonoxidized constituents of the parent metal, reduced constituents of solid or liquid oxidant, of dopant constituents, or voids, or a combination thereof. Typically in these polycrystalline ceramic matrices, the oxidation reaction product crystallites are interconnected in more than one dimension, preferably in three dimensions, and the metal inclusions or voids may be partially interconnected. When the process is not conducted beyond the exhaustion of the parent metal, the ceramic composite obtained is relatively dense and essentially void-free. When the process is taken to completion, that is, when as much of the metal as desirable or possible under the process conditions has been oxidized, pores in the place of the interconnected metal will have formed in the ceramic composite. The resulting ceramic composite product of this invention comprises a plurality of axially aligned, spaced-apart cylindrical walls generally inversely replicating in opposed direction the geometric configuration of the original pattern, adjusted for melting point and thermal expansion differential volume changes of the parent metal during processing with respect to the composite body formed and cooled. In a preferred embodiment, the wall members are co-axially aligned, and the ceramic product comprises a central fluid channel and one or more concentrically disposed fluid channels. A product of this type and structure would be particularly useful as a heat exchanger.

Figure 2:
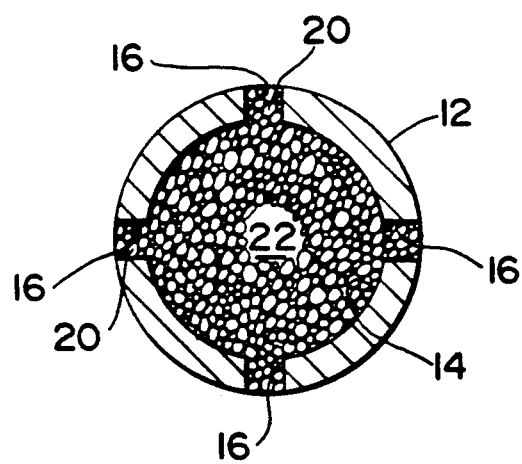
FIG. 2 is a section view on line 2—2 of FIG. 1 with filler material in place.
Figure 3:
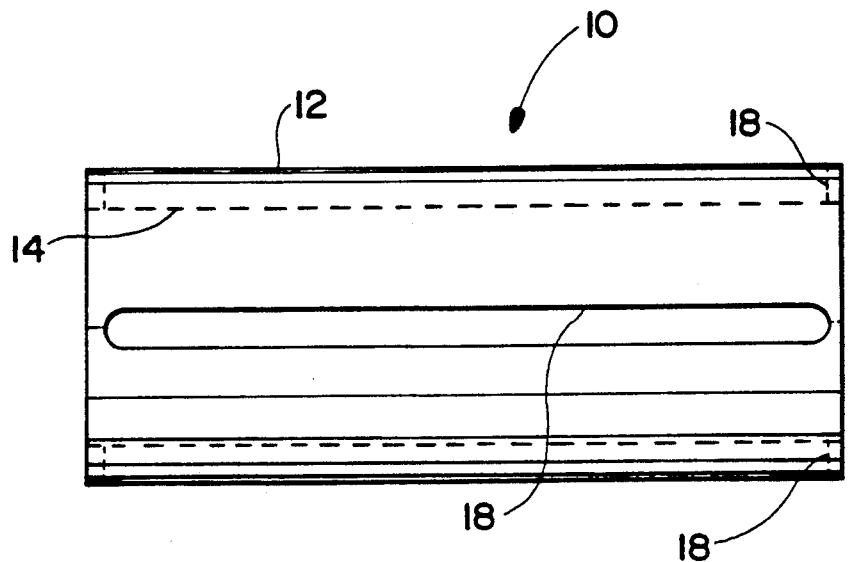
FIG. 3 is a horizontal view of the shaped parent metal illustrating an alternative embodiment.
Figure 4:
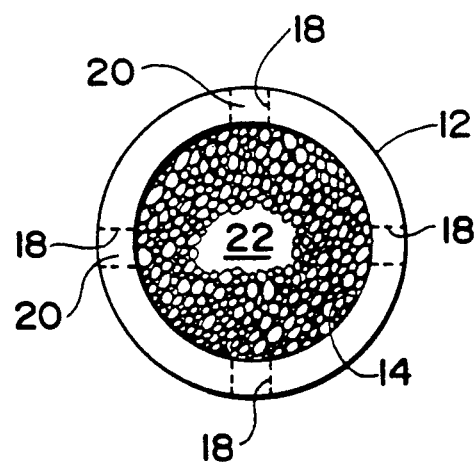
FIG. 4 is an end view of the shaped parent metal of FIG. 3 with filler material in place.
Figure 5:
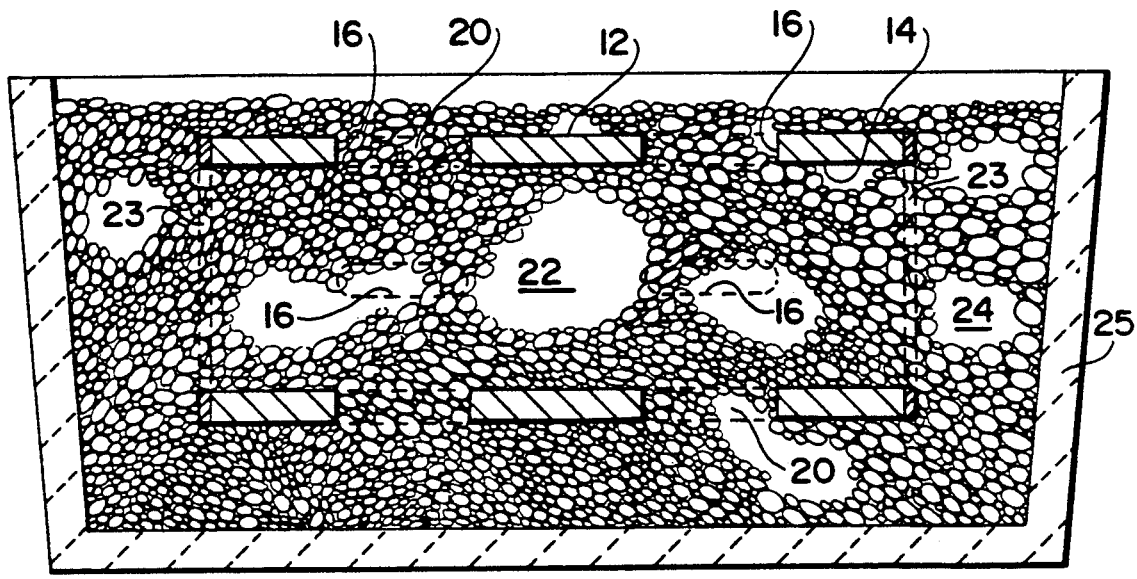
FIG. 5 is a longitudinal view in cross-section showing an assembly of a pattern of shaped parent metal of FIG. 1 embedded with a bed of particulate filler and contained within a refractory vessel.
Figure 6:
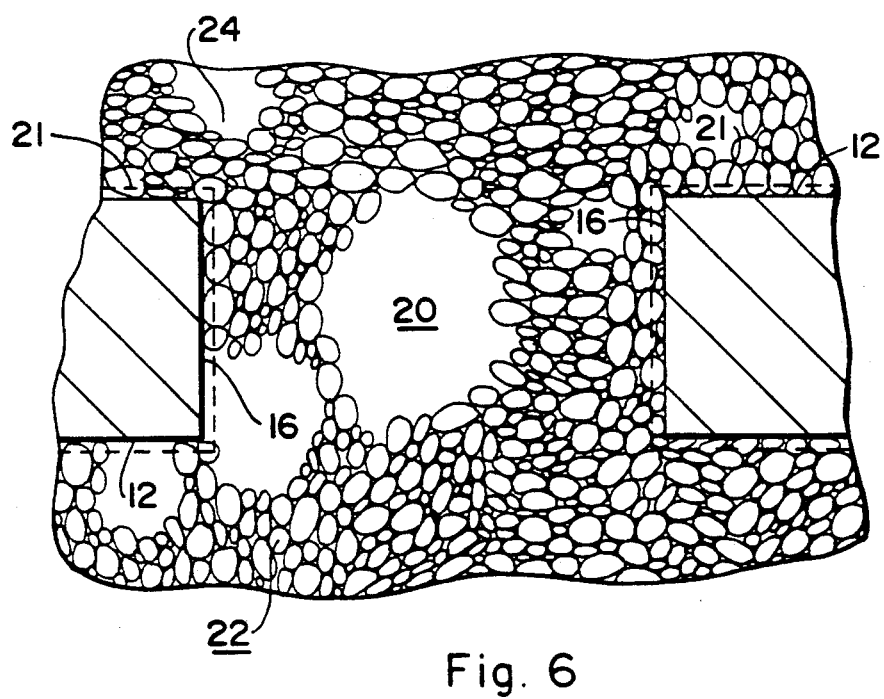
FIG. 6 is an enlarged, fragmentary, sectional view of a slot area of the shaped parent metal of FIG. 5 showing the support zone in the filler material.

Referring in detail to the drawings wherein the same reference numerals refer to similar parts throughout the various views, FIGS. 1 and 2 are perspective views of a cavitied pattern of parent metal, generally illustrated by the numeral 10, shaped as a cylindrical conduit or cylinder, having a wall 12 and a central bore 14 extending axially therethrough. The cylindrical conduit 12 in FIG. 1 has a plurality of bores 16 extending transversely through the wall 12 of cylinder 10. In the embodiment shown in FIGS. 3 and 4, the cylindrical conduit 10 has a plurality of elongated slots 18 extending longitudinally through nearly a complete portion of the wall 12 of the cylinder. In these embodiments, each of the bores 16 and 18 is provided with a filler material 20, as illustrated in FIGS. 2 and 4. Another bedding of filler material 22, of the same or different material from that of material 20, is disposed within each central bore 14; but if desired, the interior wall of each cylinder can be lined with a bedding of predetermined thickness so as to fill a portion only of the bore, and the innermost boundary of the bedding is provided with a suitable barrier to inhibit growth (not shown, and described below in detail). Also, if a bore has a large length to diameter ratio, a gaseous oxidant may not easily permeate the bedding during the process thereby leaving loose bedding, and in such a case it may be beneficial to provide the bedding with a liquid or solid oxidant, as explained below in greater detail. In a preferred embodiment of the invention, beddings 20 and 22 preferably comprise or contain a sinterable or self-bonding filler or a bonding or sintering agent, as explained below, whose extent or extremity from the pattern 10 of parent metal is represented by the dotted lines 21, as shown in FIG. 6. It should be understood that such a self-bonding zone may comprise a portion only of the bedding or essentially the entire bed, and further the filler material may be intrinsically self-bonding either because of an inherent property of the filler material or because a suitable material may be incorporated into the bed to provide sufficient bonding. As illustrated in FIG. 5 by way of example only, the marginal end walls of the pattern 10 of parent metal are provided with a suitable barrier 23 (described below in detail), and the parent metal is then embedded within a bedding of particulate filler 24 contained in refractory vessel 25, such as an alumina vessel. The beddings of filler 20, 22 and 24 may be the same or different in composition, purity or type.

Figure 7:
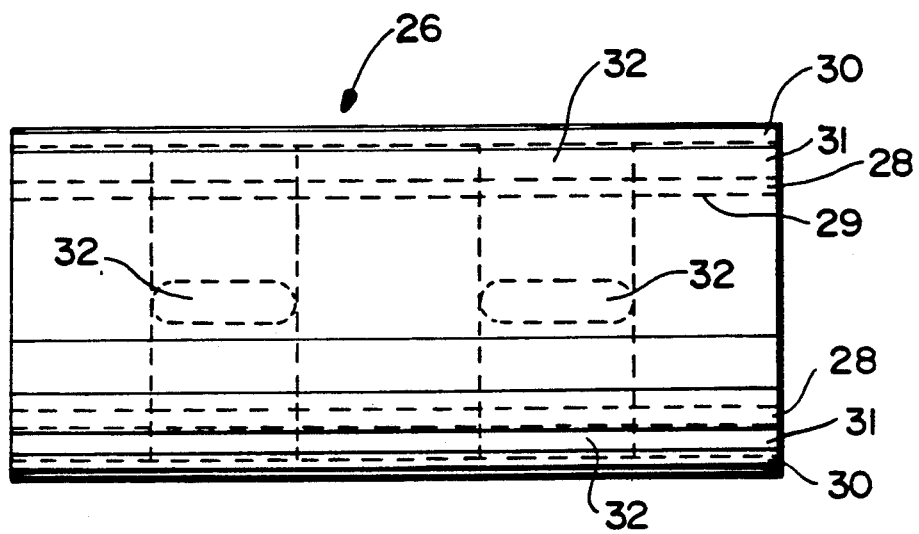
FIG. 7 is a horizontal view of a self-supporting ceramic composite body made in accordance with the invention using the pattern of the parent metal of FIG. 1.
Figure 8:
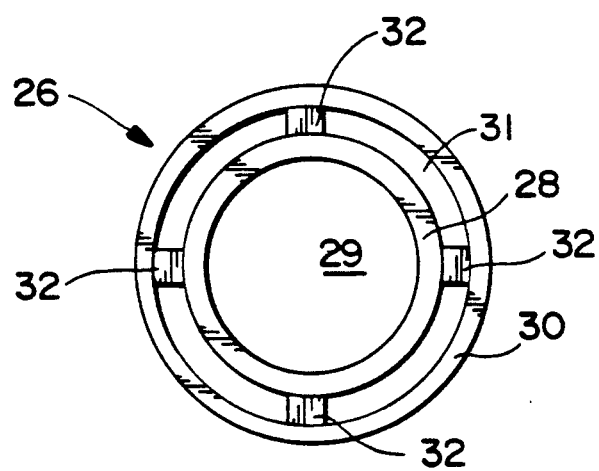
FIG. 8 is an end view of the self-supporting ceramic composite body of FIG. 7.

Upon heating of the assembly of FIG. 5 to a sufficiently high temperature to melt the parent metal, an oxidant such as a vapor-phase oxidant, which permeates the beddings and contacts the molten metal, oxidizes the molten metal, and growth of the oxidation reaction product resulting therefrom infiltrates the beddings 20, 22 and 24. Barrier means 23 inhibits growth of the oxidation reaction product from the end walls of the pattern 10 of parent metal. For example, when the parent metal is an aluminum parent metal and air is the oxidant, the oxidation reaction temperature may be from 690° C. to about 1450° C., preferably from about 900° C. to about 1350° C., and the oxidation reaction product is typically α-alumina. Molten metal migrates through the forming layer of oxidation reaction product from the volume formerly occupied by pattern 10 of parent metal, which may result in a lowered pressure within that volume due to impermeability to the surrounding atmosphere of the growing skin of oxidation reaction product and a net pressure acting on the container-like skin of oxidation reaction product. However, the beddings of filler 20, 22 and 24 (or the support zones thereof) may be intrinsically self-bonding at or above a self-bonding temperature which lies above the melting point of the parent metal and close to but below the oxidation reaction temperature. Thus, upon being heated to its self-bonding temperature, but not before, the beddings of filler 20, 22 and 24, or the support zones thereof, sinter or otherwise bond to itself and attach to the growing oxidation reaction product sufficiently to afford sufficient strength to the beddings. i.e. the respective support zones, to resist the pressure differential and thereby retain within each bedding of filler the geometry of the cylindrical walls and filled cavity formed therein by conformance of the beddings to the shape of the pattern 10 of parent metal. As described in detail below, if the fillers were to self-bond significantly prior to completion of expansion of the parent metal upon heating and melting thereof, the self-bonded fillers would be cracked or broken by expansion of the metal. In an embodiment in which only a support zone of fillers contains or comprises a sinterable or self-bonding filler or a bonding or sintering agent, dotted lines 21 in FIG. 6 indicate the extent of the support zone in the beddings. As the reaction continues, the cavity within the beddings 20, 22 and 24 formerly filled by pattern 10 of parent metal is substantially entirely evacuated by the migration of molten parent metal through the oxidation reaction product to the outer surface thereof where it contacts the vapor-phase oxidant and is oxidized to form additional oxidation reaction product. The oxidation reaction product comprises a polycrystalline ceramic material which may contain inclusions of parent metal constituents, as well as reduced constituents of the dopant and solid or liquid oxidant, if used, depending on the process conditions and reactants. Upon completion of the reaction and evacuation of the volume formerly occupied by pattern 10 of parent metal, the assembly is allowed to cool to yield the resulting ceramic composite, generally illustrated as 26 in FIGS. 7 and 8.

The resulting composite 26 comprises concentric cylinders 28 and 30 having a central passageway 29 and a surrounding passageway 31. The two cylinders are supported in a spaced relationship with respect to each other by a plurality of radially disposed spokes or ribs 32 (see FIG. 8) that are formed in situ and integrally with the concentric cylinders of composite 26. Excess filler, if any, is separated from the composite body as by grit blasting, vibrating, tumbling, grinding, or the like. An economical technique is to employ grit blasting utilizing grit particles of a material which is suitable as the filler or as a component of the filler so that the removed filler and grit may be re-used as filler in a subsequent operation. Even though the filler may self-bond during the process, the degree of strength of this self-bonded filler is typically much less than the strength of the resulting composite, and therefore, it is feasible to remove excess self-bonded filler by grit blasting without significant damage to the composite body 26. The surfaces of the resulting ceramic composite products may be ground or machined or otherwise formed to any desired size, shape or finish consistent with the size and shape of the passageways formed therein.

It will be observed that pattern 10 of parent metal, shaped as a cylindrical conduit 12, produces two concentrically arranged cylinders, such as cylinders 28 and 30. Thus, during the oxidation reaction process, the ceramic matrix grows laterally in both directions, i.e. (a) inwardly from the wall surface of the parent metal into the cavity or central bore and (b) outwardly from the exterior wall surface of the parent metal, to produce inner cylinder 28 and outer cylinder 30, as well as support members 32.

The pattern of parent metal may be configured or structured to produce more than two cylinders. For example, a pattern of a parent metal, generally illustrated as 36 in FIG. 9, may be shaped as two concentric metal cylinders 38 and 40, each having transverse bores 42 and 44. Longitudinal ribs 45, preferably of a ceramic such as alumina which may be made according to the Commonly Owned patent applications and patents, are inserted between metal cylinders 38 and 40. The pattern is embedded in a suitable filler contained in a refractory vessel, similar to that shown with reference to FIG. 5, such that beddings of filler are disposed in the central bore of inner cylinder 38, between cylinders, and surrounding the outer cylinder, and in bores 42 and 44. During the oxidation reaction process, the cylindrical wall of inner cylindrical pattern 38 forms oxidation reaction product in opposed directions to produce a pair of inner cylindrical ceramic walls 46 and 48 that are supported concentrically and spatially by a plurality of spokes or ribs 50 (see FIG. 10) resulting from growing oxidation reaction product as a matrix into the filler that was placed in the transverse bores 42. Similarly, the cylindrical wall of outer cylindrical pattern 40 forms oxidation reaction product in opposed directions during the oxidation reaction process to form a pair of outer cylindrical ceramic walls 52 and 54 that are supported concentrically and spatially by a plurality of spokes 55 resulting from growing oxidation reaction product as a matrix into the filler that was placed in the transverse bores 44. The oxidation reaction product developed by growth of the ceramic walls will form at the footings of longitudinal ribs 45 thereby bonding these ribs in place and supporting spaced wall members 48 and 52. The resulting composite has central fluid passageway 51 and surrounding or concentric passageways 53, 57 and 59.

Figure 10:
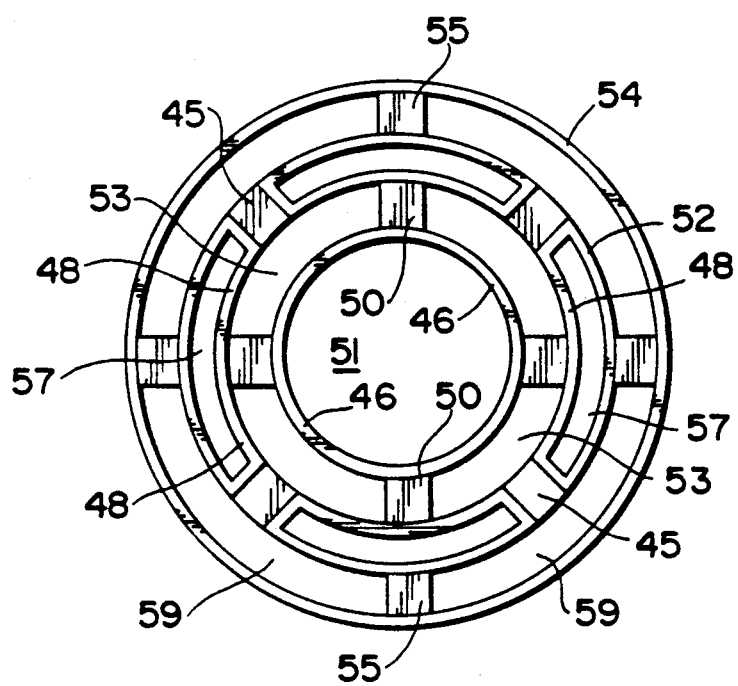
FIG. 10 is an end view of a self-supporting ceramic body made in accordance with the invention using the pattern of the parent metal of FIG. 9.
Figure 11:
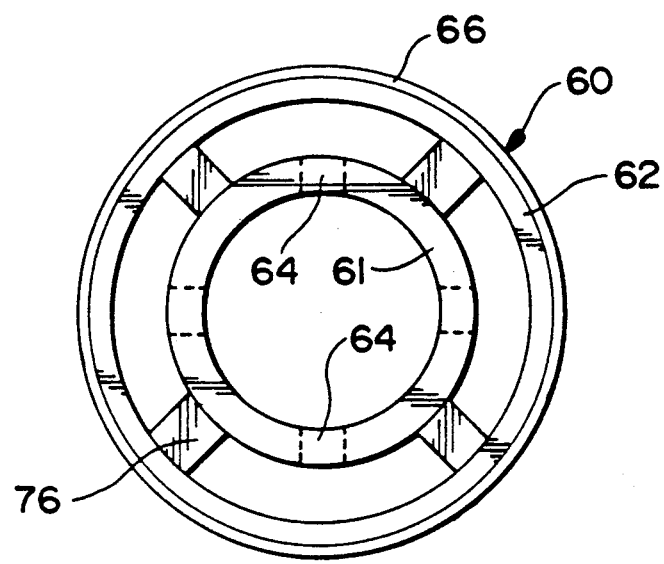
FIG. 11 is a cross-sectional view of a parent metal pattern useful in producing a ceramic composite by an alternative embodiment.
Figure 12:
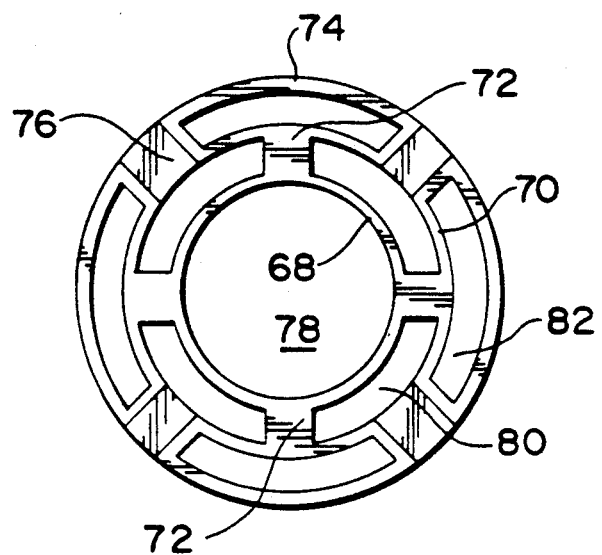
FIG. 12 is a view of a self-supporting ceramic body made in accordance with the invention using the pattern of the parent metal of FIG. 11.

As a further embodiment, a pattern of a parent metal, generally illustrated as 60 in FIG. 11, may be shaped such that when embedded in the filler 24 contained in the vessel 25 as in FIG. 5, an inner cylindrical pattern 61 of parent metal is surrounded by and concentrically positioned with respect to an outer cylindrical pattern 62 of parent metal. The inner cylindrical pattern 61 contains a plurality of transverse bores 64. Also, the outer cylindrical pattern wall 62 is surrounded by a barrier means 66, which inhibits, interferes, or terminates growth or development of the oxidation reaction product, as further explained below. As with the other embodiments, a suitable filler, which may include support zone(s), is positioned or placed within the center bore of cylinder 62 and between the inner cylindrical pattern 61 and the outer cylindrical pattern 62, as well as within the transverse bores 64. As a result of the oxidation reaction process, the cylindrical wall of the inner cylindrical pattern 61 develops oxidation reaction product in opposed directions, thereby forming a pair of inner cylindrical ceramic walls 68 and 70 that are supported concentrically and spatially by a plurality of ribs or spokes 72 resulting from growing oxidation reaction product as a ceramic matrix into the filler that was previously placed within the transverse bores 64. The barrier means 66 prevents the cylindrical wall of the outer cylindrical pattern 62 from growing or developing oxidation reaction product in an outward direction. Thus, the cylindrical pattern 62 produces an integral, cylindrical, ceramic composite outer wall 74 during the oxidation reaction process by growth of the oxidation reaction product into the filler. One or more rods or ribs 76, such as a ceramic rib, may be disposed between the cylindrical walls as described with reference to the embodiment of FIGS. 9 and 10. The ceramic composite comprises a central fluid passageway 78 and concentric passageways 80 and 82. Thus, by the practice of this invention a ceramic composite product can be produced having two or more cylindrical walls by varying the pattern of the cavitied parent metal and the use of a barrier means.

By selecting an appropriate filler and maintaining the oxidation reaction conditions for a time sufficient to evacuate substantially all the molten parent metal from the filled cavity initially occupied by the pattern, a faithful inverse replication of the geometry of the pattern (including any bores, apertures, or the like) is attained. While the shape illustrated in the drawings (and therefore of any formed cylindrical walls and spaces) is relatively simple, cavities and other spaces can be formed within the ceramic composite which inversely replicate with fidelity the shapes of patterns of much more complex geometry.

The filler, which is conformable to the pattern, utilized in the practice of the invention may be one or more of a wide variety of materials suitable for the purpose. As used herein and in the claims, the term "conformable" as applied to the filler means that the filler is one which can be packed around, laid up against, or wound around a pattern and will conform to the geometry of the pattern embedded with filler. For example, if the filler comprises particulate material such as fine grains of a refractory metal oxide, the pattern is embedded by the filler so that the pattern defines a filled cavity (filled or occupied by the pattern). However, the filler need not be as particulate, but may include, for example, fibers, whiskers, powders, or the like. The filler also may comprise either a heterogeneous or homogeneous combination of two or more such components or geometric configurations, e.g. a combination of small particulate grains and whiskers. The physical configuration of the filler should permit the pattern of parent metal to be embedded by or within a mass of filler with the filler closely conforming to the surfaces of the pattern. The parent metal pattern is referred to herein and in the claims as a "pattern" because the space ultimately formed in the composite is the negative of the geometry of the pattern. The pattern thus initially forms or occupies a (filled) space within or between the beddings of conformable filler, with the space being initially shaped and filled by the pattern. Suitable fillers include, for example, oxides, carbides, nitrides and borides, such as alumina, zirconia, titanium boride, silicon carbide, aluminum nitride and titanium nitride, or binary, ternary or higher order metal oxide compounds such as the spinels, e.g. magnesium aluminate spinel.

The conformable filler useful in the practice of the invention is one which, under the oxidation reaction conditions of the invention as described below, is permeable to passage therethrough of the oxidant when the latter is a vapor-phase oxidant. In any case, the filler also is permeable to the growth or development therethrough of oxidation reaction product. During the oxidation reaction, it appears that molten parent metal migrates through the oxidation reaction product being formed to sustain the reaction. This oxidation reaction product is generally impermeable to the surrounding atmosphere, and therefore the furnace atmosphere, e.g. air, cannot pass therethrough. As explained in the aforesaid Commonly Owned U.S. Pat. No. 4,828,785 the impermeability of the growing oxidation reaction product to the furnace atmosphere results in a pressure differential problem when the oxidation reaction product encloses a cavity being formed by migration of molten parent metal. This problem is overcome in the aforesaid Commonly Owned patent application by use of a self bonding conformable filler which, as defined therein, is a filler which, at a temperature above the melting point of the parent metal and close to, but below, the oxidation reaction temperature, partially sinters or otherwise bonds to itself and to the growing layer of oxidation reaction product sufficiently to provide structural strength from the outside of the growing cavity to retain the replicated geometry of the mold in the developing cavity at least until the growing oxidation reaction product structure attains sufficient thickness to be self-supporting against the pressure differential which develops across the wall of growing oxidation reaction product defining the cavity being formed. However, the self-bonding filler is not to sinter or self-bond at too low a temperature because, if it does, it could be cracked by thermal expansion and volume change upon melting of the parent metal as the latter is heated to operating temperature. In other words, the self-bonding filler should retain its conformability to accommodate the difference in volume changes between it and the parent metal while the latter is being heated and melted and then selfbond to provide mechanical strength to the developing cavity as the oxidation reaction progresses. However, the technique of the present invention typically avoids the pressure-differential problem because there is not formed, at least to any significant degree, a cavity totally enclosed by growing oxidation reaction product. However, barrier means which are atmosphere impermeable may be used and in some cases deployed so that they block access of the furnace atmosphere to the forming cavity, resulting in creation of a pressure-differential across the walls of the growing oxidation reaction product. In such circumstances a self-bonding filler is employed to afford mechanical strength at least during the initial growth stage, as described above.

As used herein and in the claims to characterize conformable fillers, the term "self-bonding" means those fillers which, when placed in conforming contact with the positive pattern of the parent metal, retain sufficient conformability to accommodate melting point volume change of the parent metal and differential thermal expansion between the parent metal and the filler and, at least in a support zone thereof immediately adjacent the positive pattern, are intrinsically self-bonding but only at a temperature above the melting point of the parent metal but below and sufficiently close to the oxidation reaction temperature to allow the aforesaid accommodation. Such self-bonding of the filler endows it with sufficient cohesive strength to retain the inversely replicated negative pattern against pressure differentials which develop across it by movement of the parent metal into the filler.

It is not necessary that the entire mass into or bed of filler comprise a conformable filler or, when required, a self-bonding filler, although such arrangement is within the purview of the invention. The filler need be conformable and/or self-bonding only in that portion of the bed of filler adjacent to and shaped by the positive pattern of parent metal. In other words, the filler need be conformable and/or self-bonding only to a depth sufficient, in the case of conformability, to conform to the positive pattern of the parent metal precursor, and, in the case of self-bonding, to provide sufficient mechanical strength in a particular situation. The balance of the filler bed need not be conformable and/or self-bonding.

In any case, the filler should not sinter, fuse or react in such a way as to form an impermeable mass so as to block the infiltration of the oxidation reaction product therethrough or when a vapor-phase oxidant is used, passage of such vapor-phase oxidant therethrough. Further, the filler should be sufficiently conformable to accommodate the thermal expansion differential between the parent metal and the filler upon heating of the assembly, and the volume change of the metal upon melting thereof while retaining close conformity to the positive pattern of the parent metal precursor.

It should be understood that the filler properties of being permeable, conformable, and self-bonding as described above are properties of the overall composition of the filler, and that individual components of the filler need not have any or all of these characteristics. Thus, the filler may comprise either a single material, a mixture of particles of the same material but of different mesh size, or mixtures of two or more materials. In the latter case, some components of the filler may not be sufficiently self bonding or sinterable at the oxidation reaction temperature but the filler of which it is a component part will have self-bonding or sintering characteristics at and above its self-bonding temperature because of the presence of other materials. A large number of materials which make useful fillers in the ceramic composite by imparting desired qualities to the composite also will have the permeable, conformable and self-bonding qualities described above. Such suitable materials will remain unsintered or unbonded sufficiently at temperatures below the oxidation reaction temperature so that the filler in which the pattern is embedded can accommodate thermal expansion and melting point volume change, and yet will sinter or otherwise self-bond only upon attaining a self-bonding temperature which lies above the parent metal melting point but close to and below the oxidation reaction temperature, sufficiently to impart the requisite mechanical strength to prevent collapse of the forming cavity during the initial stages of growth or development of the oxidation reaction product.

A solid, liquid or vapor-phase oxidant, or a combination of such oxidants, may be employed, as noted above. For example, typical oxidants include, without limitation, oxygen, nitrogen, a halogen, sulphur, phosphorus, arsenic, carbon, boron, selenium, tellurium, and compounds and combinations thereof, for example, silica (as a source of oxygen), methane, ethane, propane, acetylene, ethylene, and propylene (as a source of carbon), and mixtures such as air, $H_2/H_2O$ and $CO/CO_2$, the latter two (i.e. $H_2/H_2O$ and $CO/CO_2$) being useful in reducing the oxygen activity of the environment. Depending on the oxidant employed, the resulting ceramic matrix may comprise an oxide, a carbide, a nitride or a boride.

Although any suitable oxidant may be employed, a vapor-phase (gas) oxidant is preferred, and specific embodiments of the invention are described herein with reference to use of vapor-phase oxidants. If a gas or vapor oxidant is used, the filler is permeable to the gas so that upon exposure of the bed of filler to the oxidant, the vapor-phase oxidant permeates the bed of filler to contact the molten parent metal therein. The term "vapor-phase oxidant" means a vaporized or normally gaseous material which provides an oxidizing atmosphere. For example, oxygen or gas mixtures containing oxygen (including air) are preferred vapor-phase oxidants, as in the case where aluminum is the parent metal, with air usually being more preferred for obvious reasons of economy. When an oxidant is identified as containing or comprising a particular gas or vapor, this means an oxidant in which the identified gas or vapor is the sole, predominant or at least a significant oxidizer of the parent metal under the conditions obtaining in the oxidizing environment utilized. For example, although the major constituent of air is nitrogen, the oxygen content of air is the oxidizer for the parent metal because oxygen is a significantly stronger oxidant than nitrogen. Air therefore falls within the definition of an "oxygen-containing gas" oxidant but not within the definition of a "nitrogen-containing gas" oxidant. An example of a "nitrogen-containing gas" oxidant as used herein and in the claims is "forming gas", which contains about 96 volume percent nitrogen and 4 volume percent hydrogen.

When a solid oxidant is employed, it is usually dispersed through the entire bed of filler or through a portion of the bed adjacent the parent metal, in the form or particulates or powders admixed with the filler, or perhaps as coatings on the filler particles. Any suitable solid oxidant may be employed including elements, such as boron or carbon, or reducible compounds, such as cordierite, silicon dioxide or certain borides of lower thermodynamic stability than the boride reaction product of the parent metal. For example, when boron or a reducible boride is used as a solid oxidant for an aluminum parent metal, the resulting oxidation reaction product is aluminum boride. If titanium is the parent metal, aluminum dodecaboride is a suitable solid oxidant and the product comprises titanium diboride.

In some instances, the oxidation reaction may proceed so rapidly with a solid oxidant that the oxidation reaction product tends to fuse due to the exothermic nature of the process. This occurrence can degrade the microstructural uniformity of the ceramic body. This rapid exothermic reaction can be avoided by mixing into the composition relatively inert fillers which exhibit low reactivity. Such fillers absorb the heat of reaction to minimize any thermal runaway effect. An example of such a suitable inert filler is one which is substantially the same as the intended oxidation reaction product.

If a liquid oxidant is employed, the entire bed of filler or a portion thereof adjacent the molten metal may be coated, or soaked as by immersion and drying, with the oxidant to impregnate the filler. Reference to a liquid oxidant means one which is a liquid under the oxidation reaction conditions and so a liquid oxidant may have a solid precursor, such as salt, which is molten at the oxidation reaction conditions. Alternatively, the liquid oxidant may be a liquid or a solution, which is used to impregnate part or all of the filler and which is melted or decomposed at the oxidation reaction conditions to provide a suitable oxidant moiety. Examples of liquid oxidants as herein defined include low melting glasses.

As noted previously, a bonding or sintering agent may be included as a component of the filler in those cases where the filler would not otherwise have sufficient inherent self-bonding or sintering characteristic to prevent collapse of the space being formed into the volume formerly occupied by the pattern. This bonding agent may be dispersed throughout the filler or in the support zone only. Suitable materials for this purpose include organo-metallic materials which under the oxidizing conditions required to form the oxidation reaction product will at least partially decompose and bind the filler sufficiently to provide the requisite mechanical strength. The binder should not interfere with the oxidation reaction process or leave undesired residual by-products within the ceramic composite product. Binders suitable for this purpose are well known in the art. For example, tetraethylorthosilicate is exemplary of suitable organo-metallic binders, leavig behind at the oxidation reaction temperature a silica moiety which effectively binds the filler with the requisite cohesive strength.

As explained in the Commonly Owned patent applications and patents, dopant materials, used in conjunction with the parent metal, favorably influence the oxidation reaction process, particularly in systems employing aluminum as the parent metal. The dopant or dopants used in conjunction or in association with the parent metal (1) may be provided as alloying constituents of the parent metal, (2) may be applied to at least a portion of the surface of the parent metal, or (3) may be applied to or incorporated into part or all of the filler material or preform, or any combination of two or more of techniques (1), (2), or (3) may be employed. For example, an alloyed dopant may be used solely or in combination with a second externally applied dopant. In the case of technique (3), wherein additional dopant or dopants are applied to the filler material, the application may be accomplished in any suitable manner as explained in the Commonly Owned patent applications and patents.

The function or functions of a particular dopant material can depend upon a number of factors. Such factors include, for example, the particular parent metal, the particular combination of dopants when two or more dopants are used, the use of an externally applied dopant in combination with a dopant alloyed with the precursor metal, the concentration of dopant employed, the oxidizing environment, and the process conditions.

Dopants useful for an aluminum parent metal, particularly with air as the oxidant, include magnesium, zinc, and silicon, either alone or in combination with other dopants, as described below. These metals, or a suitable source of the metals, may be alloyed into the aluminum-based parent metal at concentrations for each of between about 0.1-10% by weight based on the total weight of the resulting doped metal. These dopant materials or a suitable source thereof (e.g. MgO, ZnO, or $SiO_2$) may be used externally to the parent metal. Thus an alumina ceramic structure is achievable for the aluminum-silicon parent metal using air as the oxidant by using MgO as a dopant applied to the metal surface in an amount greater than about 0.0008 gram Mg per gram of parent metal to be oxidized and greater than 0.003 gram Mg per square centimeter of parent metal upon which to MgO is applied.

Additional examples of dopant materials for aluminum parent metal include sodium, germanium, tin, lead, lithium, calcium, boron, phosphorus, and yttrium which may be used individually or in combination with one or more dopants depending on the oxidant, and process conditions. Rare earth elements such as cerium, lanthanum, praseodymium, neodymium, and samarium are also useful dopants, and herein again especially when used in combination with other dopants. These dopant materials, as explained in the Commonly Owned patent applications and patents, are effective in promoting polycrystalline oxidation reaction growth for the aluminum-based parent metal systems.

As disclosed in Commonly Owned U.S. Pat. No. 4,923,832, a barrier means may be used to inhibit growth or development of the oxidation reaction product beyond the barrier. Suitable barrier means may be any material, compound, element, composition, or the like, which, under the process conditions of this invention, maintains some integrity, is not volatile, and preferably is permeable to the vapor-phase oxidant while being capable of locally inhibiting, poisoning, stopping, interfering with, preventing, or the like, continued growth of oxidation reaction product. As shown for the embodiment illustrated in FIG. 5, a barrier means was applied to the end faces of the shaped parent metal to prevent growth of the oxidation reaction product from these surfaces. Suitable barriers especially useful for aluminum parent metal in air or an oxygen-containing gas include calcium sulfate (plaster of paris), calcium silicate, and Portland cement, and combinations thereof, which typically are applied as a slurry or paste to the surface of the pattern or the surface of the filler material when growth is to be limited to a region of the bedding. These barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed is especially desirable. For example, if the bedding comprises alumina and the resulting ceramic comprises alumina, the barrier may be admixed with alumina particulate, desirably having a mesh size about the same as that of the particulate used for the bedding, e.g. about 20-1000. Other suitable barriers include dense, refractory ceramics or metal sheaths, which desirably are open on at least one end to permit the vapor-phase oxidant to permeate the bed and contact the molten metal. In certain cases, it may be possible to supply a source of second metal with the barrier means. For example, certain grades of stainless steel compositions, when reacted under certain oxidizing process conditions as at a high temperature in an oxygen-containing atmosphere, form their component oxides such as iron oxide, nickel oxide, or chromium oxide depending on the composition of the stainless steel. Thus, in some cases, a barrier means such as a stainless steel sheath may provide a suitable source of second or foreign metal, which may effect introduction of second metals such as iron, nickel, or chromium into the flux of molten metal on contact of same.

The following are non-limiting examples of the present invention, and are intended for illustrative purposes.

EXAMPLE 1

A ceramic tubular body comprising two concentric, interconnected ceramic cylinders were produced from a cylindrical conduit (such as is shown in FIG. 2) measuring one inch in length and one inch in diameter with a ⅛-inch thick cylindrical wall containing three rows of four transverse bores 90° apart measuring ⅛ inch in diameter. The cylinder was composed of 380.1 aluminum alloy (from Belmont Metals, having a nominally identified composition by weight of 8-8.5% Si, 2-3%

Zn, and 0.1% Mg as active dopants, and 3.5% Cu as well as small amounts of Fe, Mn, and Ni, but the Mg content was sometimes higher as in the range of 0.17–0.18%). The entire exterior and interior cylindrical walls and the walls of the transverse bores were coated with 0.001 to 0.01 inch 500 grit silicon metal powder (from Atlantic Equipment Engineers, Bergenfield, New Jersey) and filled with 500 grit, green, silicon carbide prefired in air at 1250° C. for 24 hours (39 Crystolon from Norton Co.), and then completely submerged into a bed of 500 grit, green, prefired silicon carbide filler contained within a refractory vessel. The setup was heated to a process setpoint temperature of 900° C. for 24 hours in air. The total furnace time equated to 35 hours with 6-hour heat-up and 5-hour cool-down cycles.

Figure 9:
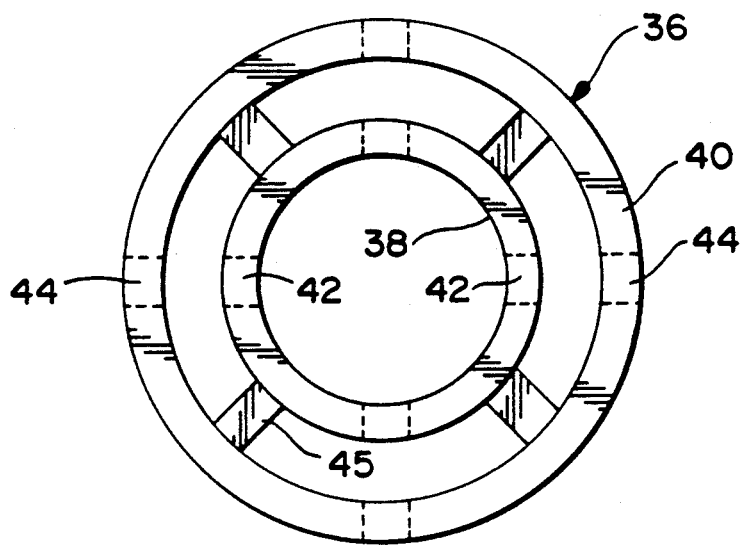
FIG. 9 is an end view of a pattern of a parent metal shaped as a pair of concentrically disposed cylindrical conduits with each conduit having a plurality of bores extending transversely through the wall of each of the cylinders.

The resulting composite material was cross-sectioned to show the pair of cylindrical walls interconnected by spokes, such as pictured in FIG. 9. The inner cylinder had an outside diameter of about 10/16 inch and a wall thickness of about 3/32 inch. The space between the pair of cylindrical walls was about ⅛ inch. The outer cylinder had an outside diameter of about 11/16 inch and a wall thickness of 3/32 inch.

The composition of the resulting composite was confirmed by x-ray diffraction and optical microscopy analysis. The composite comprised an alumina matrix embedding the silicon carbide filler.

EXAMPLE 2

Example 1 was repeated but the filler bedding was a mixture of 70% T64 alumina (−325 mesh, Alcoa) and 30% EPK (kaolin, Feldspar Corp., Edgar, FL), and the set-up was heated to a process setpoint temperature of 1000° C. for 40 hours in air. A pair of concentric cylindrical walls interconnected by spokes was formed, such as pictured in FIG. 9. The inner cylindrical wall was 1/16 inch in thickness with an outside diameter of 11/16 inch. The outer cylindrical wall had a thickness of about 1/16 inch and an outside diameter of about 11/16 inch. The space between the pair of cylindrical walls was about ⅛ inch.

EXAMPLE 3

Example 2 was repeated, but the filler bedding was alumina (A17, −325 mesh, Alcoa) and the set-up was heated to a process setpoint temperature of 1000° C. for 40 hours after 5 hours of furnace heat-up and a 5-hour furnace cool-down. A pair of concentric cylindrical walls interconnected by spokes was formed. The outside diameter of the outer cylindrical wall was 1½ inch with a thickness of about 3/32 inch. The inner cylindrical wall had a thickness of 3/32 inch and an outside diameter of 11/16 inch. The space between the pair of cylindrical walls was about ⅛ inch.

EXAMPLE 4

A one-inch long cylindrical conduit of 380.1 aluminum alloy (similar to FIG. 2) was completely submerged into a bed of cordierite contained within a refractory container. The cylindrical conduit was one inch in length and had a one-inch outside diameter and walls having ⅛ inch diameter transverse bores. The inside cylindrical wall and walls of the transverse bores were filled with cordierite filler. The set-up was heated to a process setpoint temperature of 1000° C. for 40 hours in air. The total furnace time equated to 50 hours with 5-hour heat-up and 5-hour cool-down cycles. The growth of the ceramic composite into a pair of concentric cylindrical walls interconnected by spokes was very uniform. The outside diameter of the outer cylindrical wall was approximately 11/16 inch with a thickness of about 1/16 inch. The inner cylindrical wall had a thickness of about 1/16 inch and an outside diameter of about 11/16 inch. The space between the pair of cylindrical walls was about ⅛ inch.

These exemplary embodiments, described in detail above, demonstrate the utility of the present invention, and numerous combinations and variations other than those exemplified are within the skill of the art.

What is claimed is:

1. A self-supporting ceramic composite body comprising a plurality of axially aligned, spaced apart cylindrical walls having a bounded cross-section forming a central bore and at least one longitudinal channel between said cylindrical walls, and connecting means for supporting said cylindrical walls in a spaced relationship, said connecting means being located between said cylindrical walls and said cylindrical walls and said connecting means comprising a polycrystalline ceramic matrix incorporating at least one filler material, said cylindrical walls and said connecting means inversely replicating in opposed directions the geometry of a shaped parent metal ingot disposed in at least one bedding of filler material upon evacuation of said parent metal from its initial location to form said cylindrical walls and said connecting means concurrently with the oxidation reaction of molten parent metal by migration of said molten parent metal from said initial location to form said polycrystalline ceramic matrix within said at least one bedding of filler material, said ceramic matrix comprising the oxidation reaction product of said parent metal and an oxidant.

2. The self-supporting ceramic composite body of claim 1, wherein said parent metal comprises aluminum and said oxidation reaction product comprises alumina.

3. The self-supporting ceramic composite body of claim 1, wherein said axially aligned spaced apart cylindrical walls are substantially concentric.

4. The self-supporting ceramic composite body of claim 1, further comprising a dopant utilized in conjunction with said parent metal.

5. The self-supporting ceramic composite body of claim 1, wherein said parent metal comprises aluminum.

6. The self-supporting ceramic composite body of claim 5, further comprising a dopant utilized in conjunction with said parent metal.

7. The self-supporting ceramic composite body of claim 1, wherein said oxidant comprises a vapor-phase oxidant.

8. The self-supporting ceramic composite body of claim 7, wherein said oxidant comprises an oxygen-containing gas.

9. The self-supporting ceramic composite body of claim 7, wherein said oxidant comprises a nitrogen-containing gas.

10. The self-supporting ceramic composite body of claim 1, wherein said oxidant comprises an oxidant which is solid when reacting with the molten parent metal to form said oxidation reaction product.

11. The self-supporting ceramic composite body of claim 10, wherein said oxidant comprises a reducible compound.

12. The self-supporting ceramic composite body of claim 10, wherein said oxidant comprises a material selected from the group consisting of silica, boron, carbon, and cordierite.

13. The self-supporting ceramic composite body of claim 1, wherein said parent metal comprises at least one material selected from the group consisting of silicon, titanium, tin, zirconium, and hafnium.

14. The self-supporting ceramic composite body of claim 1, wherein said at least one bedding of filler material comprises a material selected from the group consisting of at least one metal oxide of a metal selected from the group consisting of aluminum, cerium, hafnium, titanium, silicon, magnesium, boron, lanthanum, neodymium, praseodymium, samarium, scandium, thorium, uranium, yttrium and zirconium.

15. The self-supporting ceramic composite body of claim 1, wherein said ceramic matrix comprises at least one material selected from the group consisting of an oxide, a nitride, a carbide, and a boride.

16. The self-supporting ceramic composite body of claim 1, wherein said geometry of said parent metal comprises at least two spaced apart open-ended cylinders.

* * * * *